(12) United States Patent  
Esslinger

(10) Patent No.: US 6,486,438 B1  
(45) Date of Patent: Nov. 26, 2002

(54) AUTOMATED WELDING DEVICE FOR THE BUILDUP OF MATERIAL

(75) Inventor: Thomas Esslinger, Alstead, NH (US)

(73) Assignee: Bore Repair Systems, Inc., Alstead, NH (US)

( * ) Notice: Subject to any disclaimer, the term of this patent is extended or adjusted under 35 U.S.C. 154(b) by 41 days.

(21) Appl. No.: 09/669,114

(22) Filed: Sep. 25, 2000

(51) Int. Cl.⁷ .................................................. B23K 9/04
(52) U.S. Cl. ................................. 219/125.11; 219/76.14
(58) Field of Search .............................. 219/125.11, 61, 219/76.14, 137 R

(56) References Cited

U.S. PATENT DOCUMENTS

| | | | |
|---|---|---|---|
| 3,430,837 A | 3/1969 | Hein | 228/53 |
| 3,541,298 A | 11/1970 | Carkhuff | 219/130 |
| 3,594,534 A | 7/1971 | Benfield | 219/215 |
| 3,627,973 A | 12/1971 | Smith | 219/125 R |
| 3,795,785 A * | 3/1974 | Smith | 219/76.14 |
| 4,366,363 A * | 12/1982 | Wilson | 219/125.11 |
| 4,381,440 A | 4/1983 | Madewell | 219/62 |
| 4,438,600 A * | 3/1984 | Berbakov | 219/125.11 |
| 4,527,039 A | 7/1985 | Füwesi | 219/76.14 |
| 4,687,899 A | 8/1987 | Acheson | 219/76.14 |
| 4,805,826 A | 2/1989 | Moriki et al. | 228/18 |
| 4,851,639 A | 7/1989 | Sugitani et al. | 219/124.34 |
| 4,873,419 A | 10/1989 | Acheson | 219/125.1 |
| 4,892,990 A | 1/1990 | Acheson | 219/76.14 |
| 4,952,769 A | 8/1990 | Acheson | 219/76.14 |
| 4,956,540 A | 9/1990 | Kohno et al. | 219/127 |
| 5,298,710 A | 3/1994 | Acheson et al. | 219/76.14 |
| 5,539,177 A * | 7/1996 | Okuya et al. | 219/125.11 |
| 5,558,268 A | 9/1996 | Acheson | 219/76.14 |
| 5,844,201 A | 12/1998 | DiBacco et al. | 219/137.43 |

* cited by examiner

Primary Examiner—Clifford C. Shaw
(74) Attorney, Agent, or Firm—Davis & Bujold, P.L.L.C.

(57) ABSTRACT

A rotary welding attachment member comprising a cam member having a cam surface and a rotatable base movable relative to the cam member. The rotatable base supporting a support rod and the support rod supporting a rider block which is movable along the support rod. A movable torch head, supporting a welding tip, being supported by the rider block. The torch head being coupled to the rotatable base via a flexible coupling to facilitate conveyance of a welding wire and a welding gas to the torch tip while the rotatable base, the support rod, the rider block and the torch head facilitating a supply of electrical current to the torch tip. An indexing mechanism, at least partially support by the rotatable base and cooperating with the cam surface, moves the rider block radially inwardly or outwardly along the support rod as the rotatable base rotates.

19 Claims, 14 Drawing Sheets

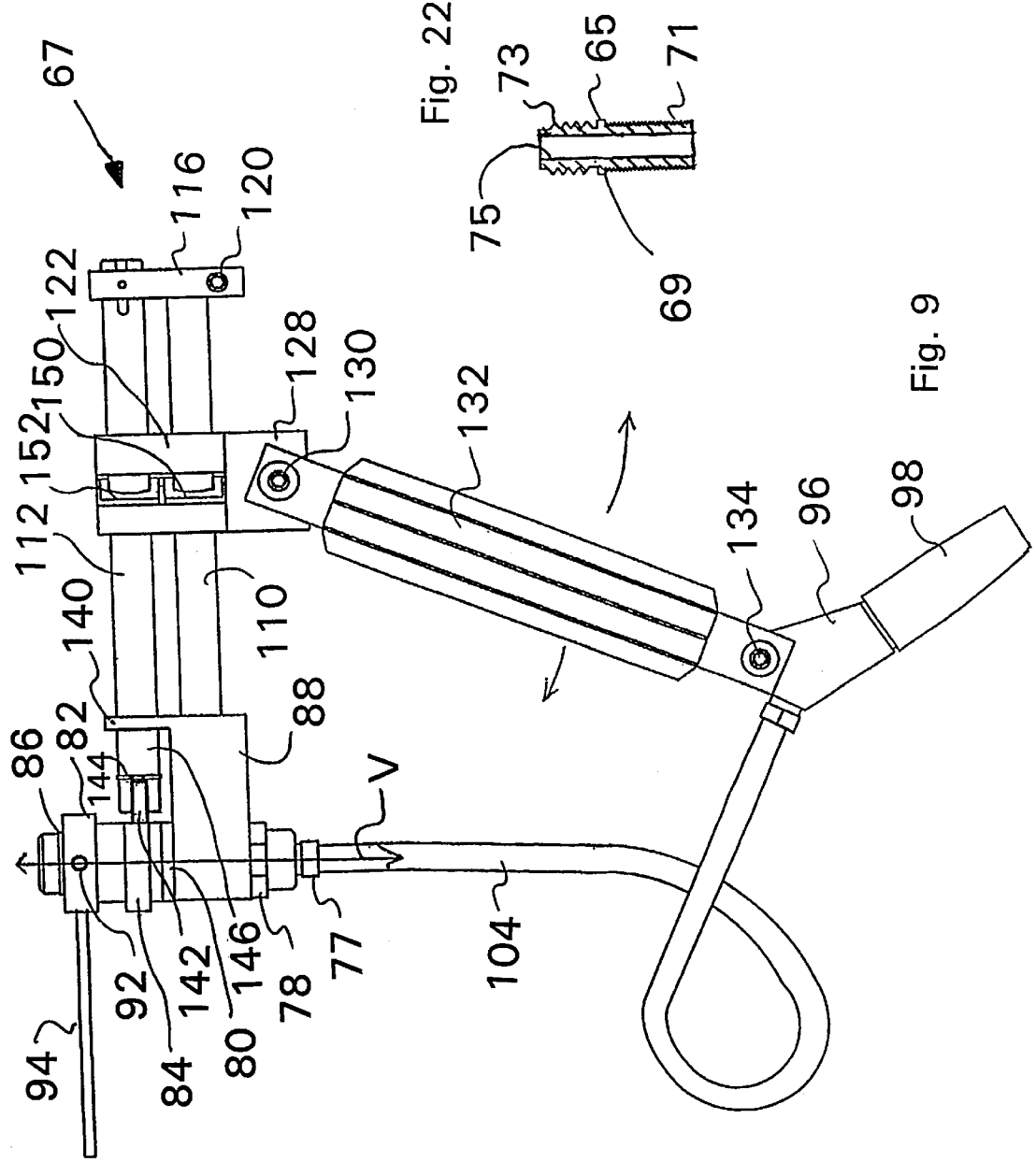

AUTOMATED WELDING DEVICE FOR THE BUILDUP OF MATERIAL

FIELD OF THE INVENTION

The present invention relates to a welding device adaptor member for attachment of a rotary welding device for providing a uniform spiral welding bead on a planar surface.

BACKGROUND OF THE INVENTION

A wide variety of machinery exists in working conditions throughout the world which is exposed to abrasive and stressful conditions. Large work loads, open and corrosive conditions and time all work to wear out surfaces, such as planar or bearing surfaces, which require replacement and/or repair. For large bearing or planar surfaces, there is often a need to buildup material. Various attempts have been made to provide automated machinery for depositing welding beads in a uniform manner on the inner bores or other surfaces.

SUMMARY OF THE INVENTION

Wherefore, it is an object of the present invention to overcome the above mentioned shortcomings and drawbacks associated with the prior art welding devices.

It is an object of the invention to provide a rotary welding attachment member for uniformly building up a planar surface which is easy to setup and provides a very uniform buildup of material on the desired surface.

It is another object of the invention to provide a rotary welding attachment member for the buildup of material that is easy to position and reposition or to change the feed direction of the movement of a rider block.

It is also an object of the invention to provide a rotary welding attachment member that will create a helical or spiral buildup of material on a planar surface, which has relatively simple adjustments to allow the rotary welding attachment member to move either radially inward or outward during the helical or spiral buildup of material.

A still further object of the invention is to provide an adapter device for facilitating coupling of the rotary welding attachment member to a variety of different welding devices.

Yet another object of the present invention is to provide a light weight rotary welding attachment member which is relatively inexpensive to manufacture but is durable, dependable and relatively easy to utilize.

The present invention relates to a rotary welding attachment member comprising: a cam member having a cam surface; a rotatable base movable relative to the cam member, the rotatable base supporting a support rod and the support rod supporting a rider block which is movable along the support rod, a movable torch head, supporting a welding tip, being supported by the rider block, the torch head being coupled to the rotatable base via a flexible coupling to facilitate conveyance of a welding wire and a welding gas to the torch tip while the rotatable base, the support rod, the rider block and the torch head facilitating a supply of electrical current to the torch tip; and an indexing mechanism, at least partially support by the rotatable base and cooperating with the cam surface, for moving the rider block radially along the support rod as the rotatable base rotates.

The present invention also relates to a rotary welding attachment member comprising: a cam member having a cam surface; a rotatable base movable relative to the cam member, the rotatable base supporting a support rod and the support rod supporting a rider block which is movable along the support rod, a movable torch head, supporting a welding tip, being supported by the rider block, the torch head being coupled to the rotatable base via a flexible coupling to facilitate conveyance of a welding wire and a welding gas to the torch tip while the rotatable base, the support rod, the rider block and the torch head facilitating a supply of electrical current to the torch tip; an indexing mechanism, at least partially supported by the rotatable base and cooperating with the cam surface, for moving the rider block radially along the support rod as the rotatable base rotates, the indexing mechanism comprising an indexing rod supported by the rotatable base, the indexing rod having a roller which is biased, by a spring, into engagement with the cam surface of the cam member and the indexing arm is coupled to the rider block to convey the rider block one of radially inwardly and radially outwardly as the indexing arm is radially conveyed to due to the engagement between the roller and the cam surface; the rider block having an indexing locking plate which engages with the indexing arm and an indexing locking plate spring biases the indexing locking plate into a partially skewed position such that any motion of the indexing arm tending to orient the indexing locking plate in a transverse, non-skewed orientation facilitates relative movement between the indexing arm and the rider block while any motion of the indexing arm in the opposite direction tends to further skew the indexing locking plate and engages the rider block with the indexing arm so that the rider block is coupled to the indexing arm.

BRIEF DESCRIPTION OF THE DRAWINGS

The invention will now be described, by way of example, with reference to the accompanying drawings in which:

FIG. 9 is a diagrammatic front elevational view of a rotary welding attachment member, according to the present invention, shown in a first welding position;

FIG. 22 is a diagrammatic transverse cross sectional view of an adapter device for coupling the rotary welding attachment member to a conventional welding device.

DETAILED DESCRIPTION OF THE INVENTION

A welding device 2, for use with the present invention, will first be described and this will be followed by a detailed description of the present invention.

Figure 1:
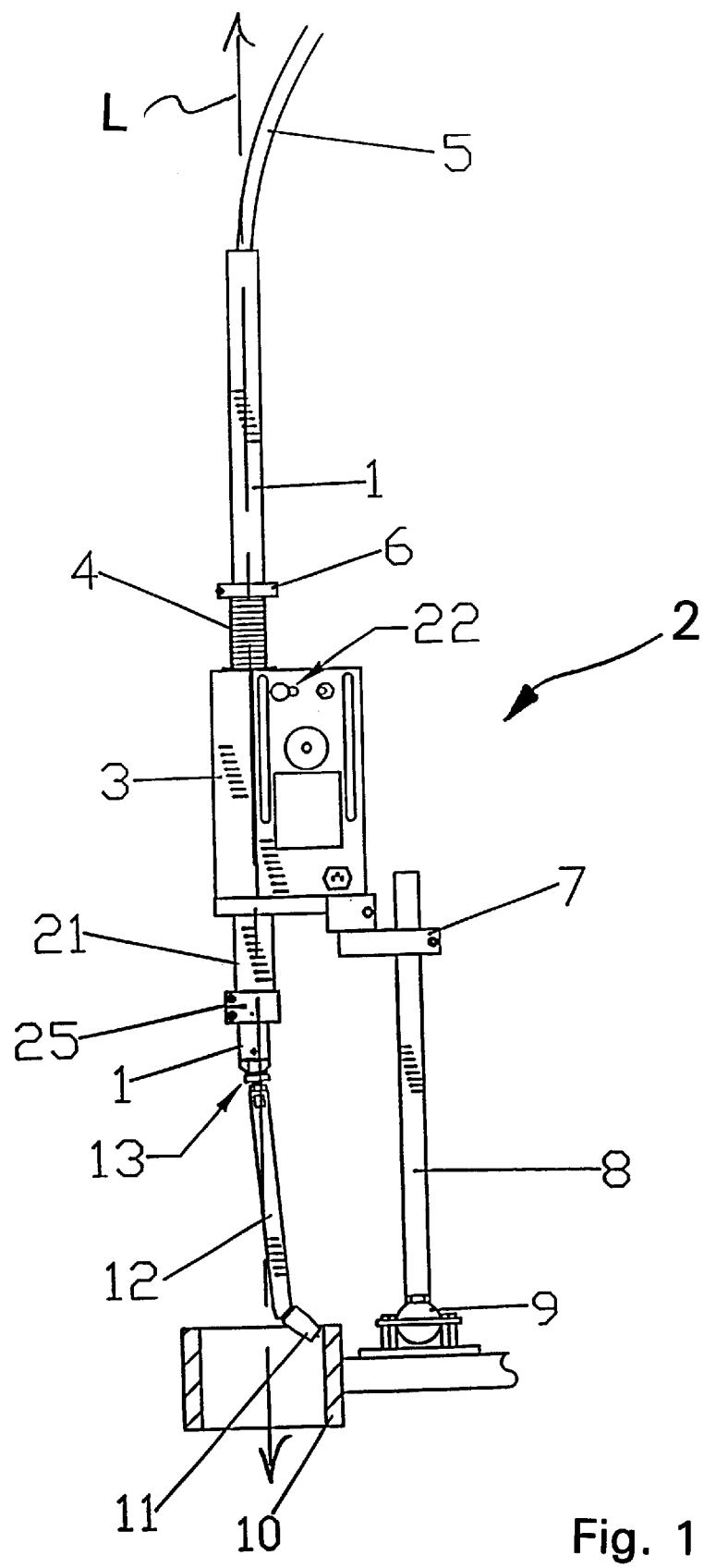
FIG. 1 is a perspective view, shown partly in cross section, of one embodiment of a welding device.

As can be seen in FIG. 1, the operator will align the axis L of the first hollow arm 1 along the desired axis of a surface, e.g. a bore 10, placing the nozzle 11 of the welding torch at a starting point of the bore where welding material is to be deposited or built up. Adjustment of the effective radii of the welding device is achieved by swinging the second hollow arm 12, via the swivel bearing 13, and positioning the nozzle 11 of the welding torch in close working proximity to the surface.

The welding device can be conveniently aligned with the bore 10 by fixing the clamping mechanism 9 to a desired support surface and then adjusting the adjustable support bracket 7 to a desired adjusted position along the length of a mounting rod 8. Once suitably secured, the clutch control mechanism 22 (see FIG. 8B) can release the welding carrier mechanism so that it is freely moved to a desired axial position.

The clutch control mechanism 22 engages a threaded guide 4, on an exterior surface of the spindle 21, that controls the axial movement of the welding mechanism as the welding mechanism is rotated about its rotational axis. The rate of axial movement depends upon the size and/or pitch of the thread of the threaded guide 4. Those skilled in the art would find it straightforward to adjust the thread size for particular welding operations. Normally, the screw thread ranges from about six to about ten threads per inch, although preferably there are seven or eight screw threads per inch.

Figure 3:
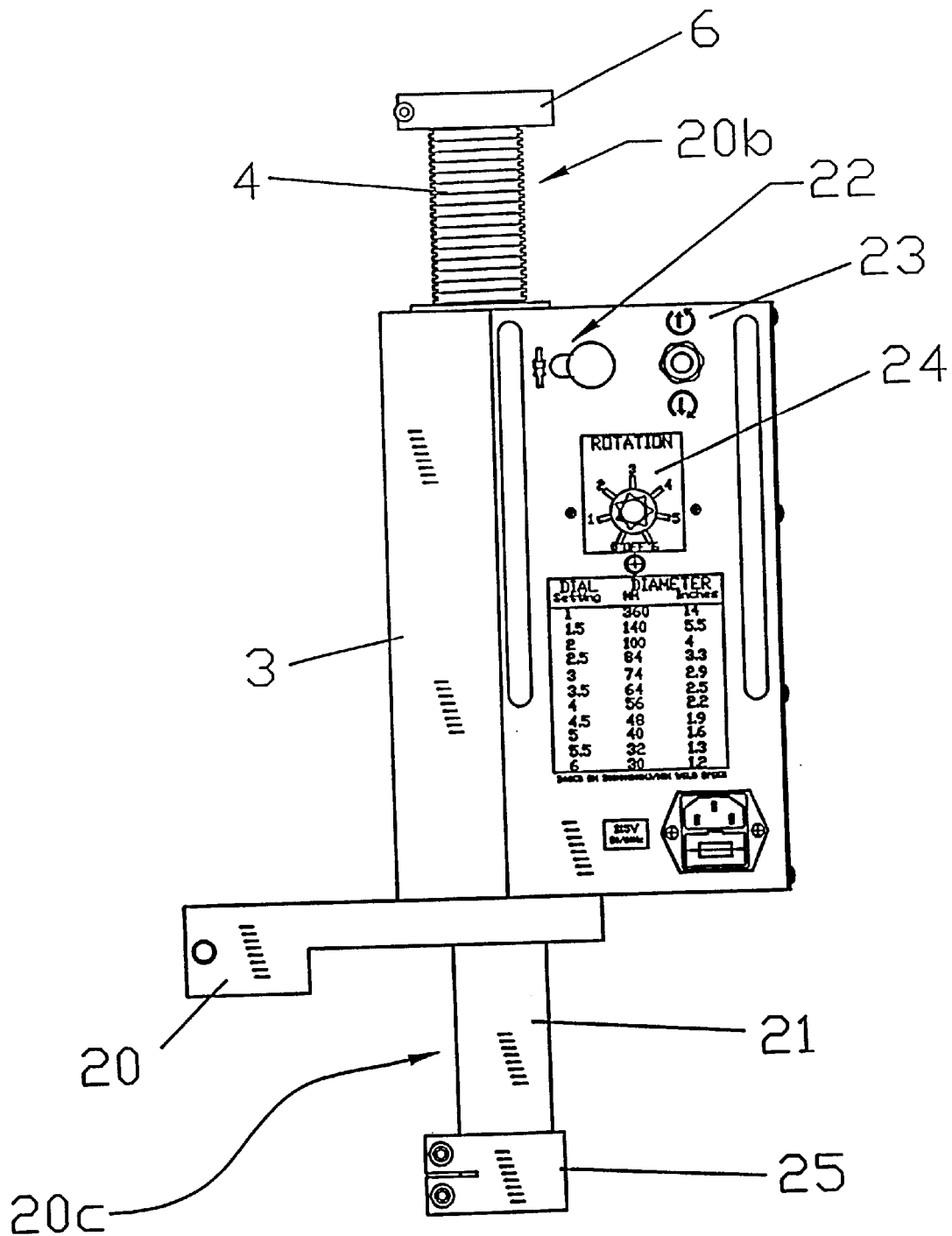
FIG. 3 is a perspective view of the rotation control apparatus placement means of the welding device.

As shown in FIG. 3, the housing 3 for the control unit surrounds the spindle 21 and the spindle 21 extends through the control unit and carries the welding material carrier mechanism. The housing 3 supports the clutch control mechanism 22 attached to the clutch means, a rotational speed control 24 attached to the control mechanism in the controller and a directional controller 23 for causing the spindle 21 to rotate in either a clockwise or counter clockwise direction. The spindle 21 has a screw mechanism portion 20b along a portion thereof located on the top side of the housing 3. A first clamp 6 and a second clamp 25 are disposed at opposing ends of the spindle 21 and they form stops and provide an indication of the position of the spindle 21.

Figure 2:
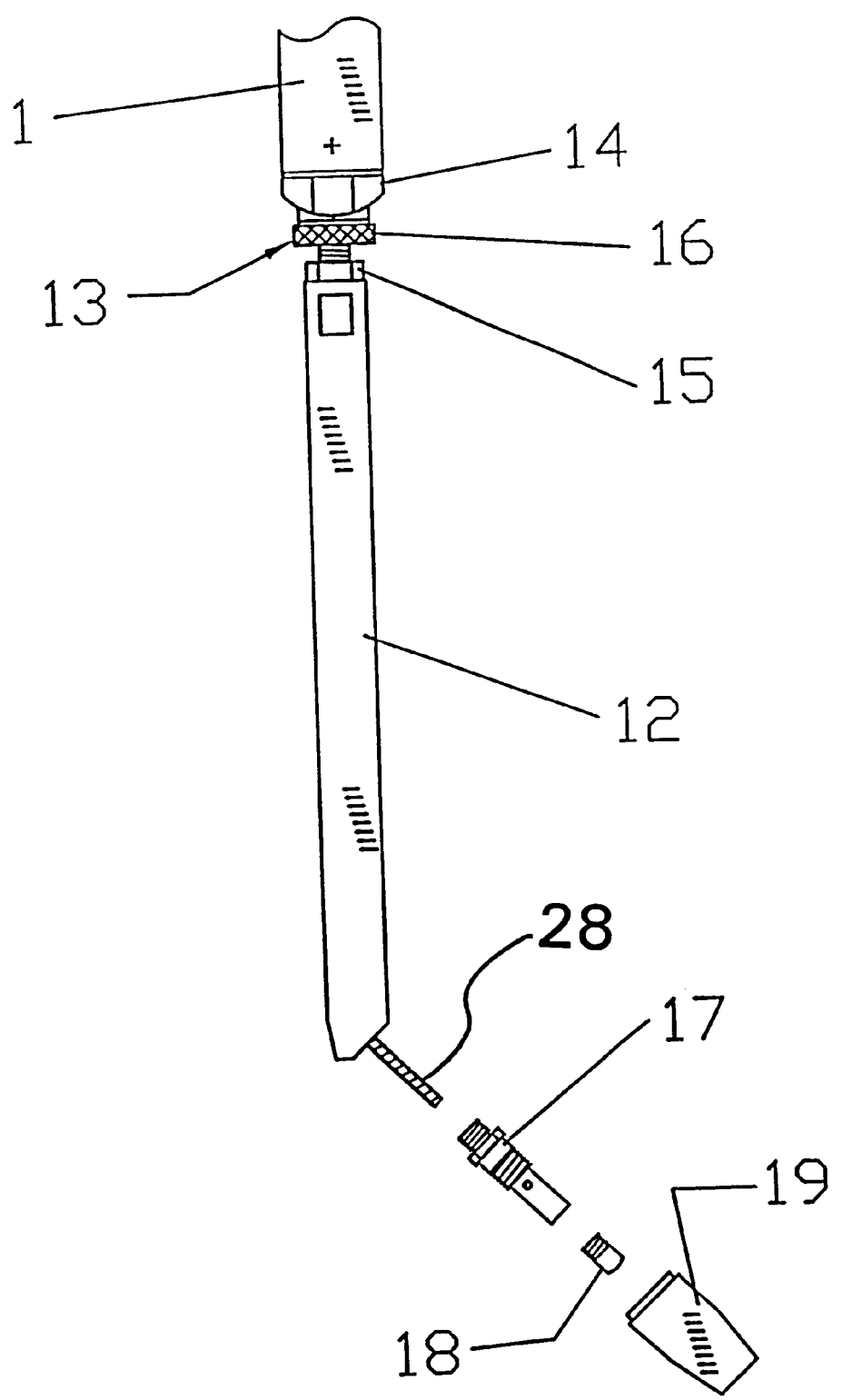
FIG. 2 is a partial perspective view of the lower axial displacement means of the welding device.
Figure 4:
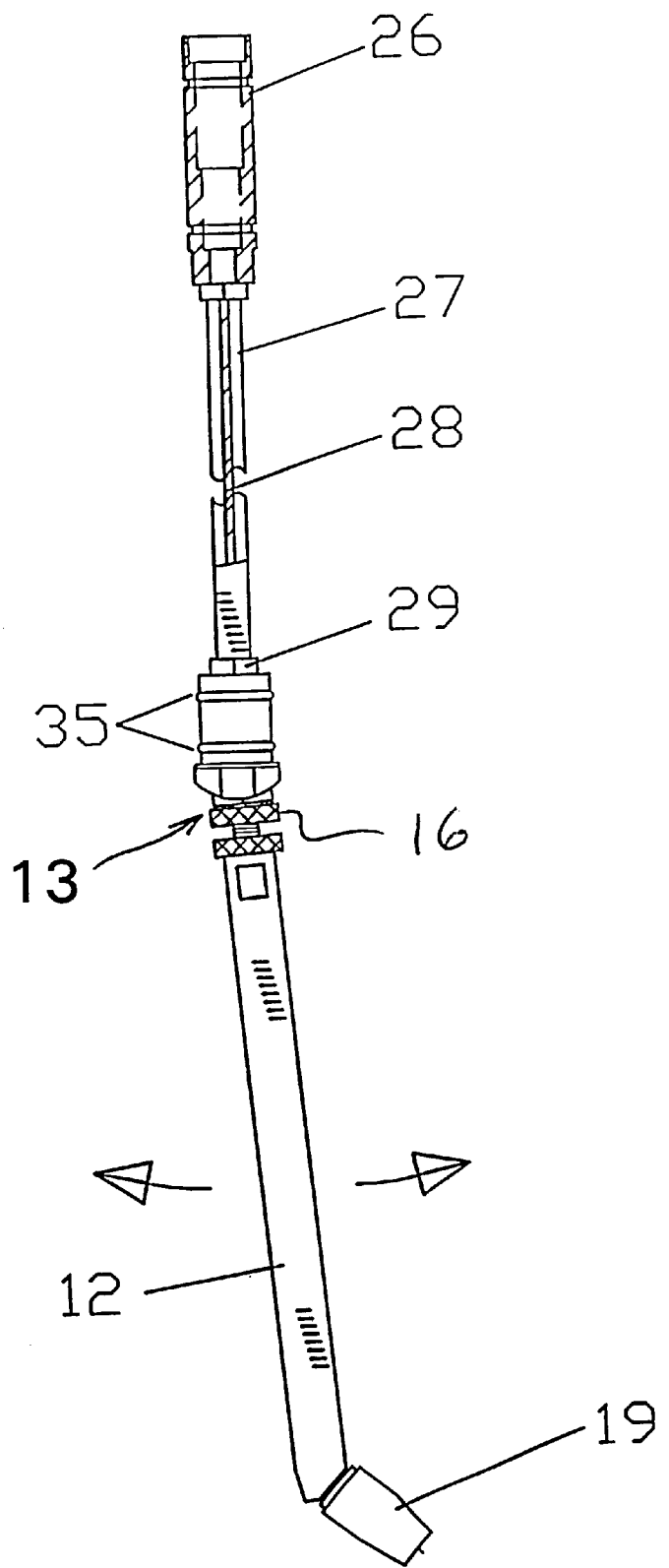
FIG. 4 is a partial cross sectional view of the swivel control placement means and lower portion of the welding material supply mechanism of the welding device.

The welding material supply mechanism comprises a welding wire guide liner, a welding current path, and a welding gas supply path or conduit. FIGS. 2 and 4 show the second arm 12 attached to the swivel bearing means 13 and the hollow first arm 1. A welding wire guide 28 passes through the first hollow arm 1, the swivel bearing 13 and the second arm 12 and through a gas diffuser 17 to a welding tip 18 and finally through an opening of the welding nozzle 19. The welding current runs through the exterior wall of a transfer tube 27, and the swivel bearing 13 and the second hollow arm 12 to the welding tip 18. The welding gas is supplied through the transfer tube 27, between the exterior surface of the welding wire guide 28 and the inner surface of the transfer tube 27, and through the second hollow arm 12 to the gas diffuser 17.

The first and second hollow arms 1 and 12 are attached to the swivel bearing 13 which facilitates adjustment of the relative orientation between those two components. A locking coupler 16, supported by the swivel bearing 13, is tightened when these components are in a desired orientation. The transfer tube 27 runs through the first hollow arm I of the welding device, and is electrically insulated from the first hollow arm 1 by a plurality of O-rings 35.

FIG. 4 shows the rotating portion of the welding core including the female electrical conductor 26, the hollow first arm wall (transfer tube) 27, the flexible wire conductor 28 and a locking nut 29 for attaching the transfer tube 27 to the swivel bearing 13. This mechanism is located and carried within the first hollow arm 1 that runs through the spindle 21 to the swivel bearing. At the swivel bearing 13, the welding current then flows through an exterior portion of the welding device 2, through the second hollow arm 12, the gas diffuser 17 and the welding tip 18 of the welding torch.

Figure 5:
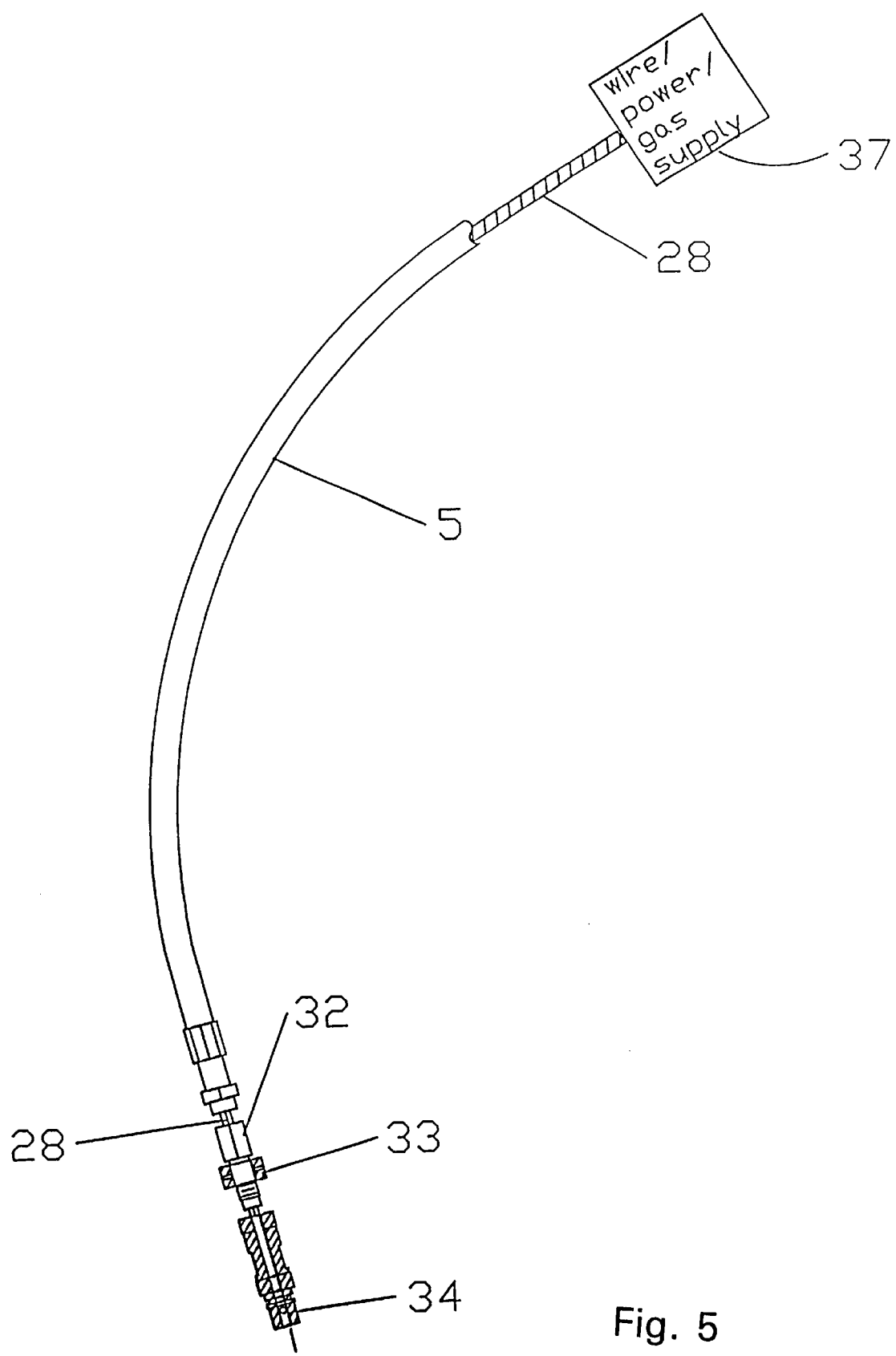
FIG. 5 is a perspective view, shown partly in cross section, of the conduit assembly of the welding device.

FIG. 5 shows wire/power/gas feed conduit 5 attached to an adapter 32, a retainer ring 33 and a stationary current transfer connecter (or male electrical connector) 34. A welding wire guide 28 is supported within the wire/power/gas feed conduit 5. It is important to note that the electrical current path does not follow along an exterior surface of the welding device until the electrical current reaches the swivel bearing 13. The welding core is supported within the spindle 21, by the first hollow arm 1, and the welding core is isolated from the extension tube by a plurality of O-rings 35 (FIG. 4) to prevent electric current from flowing through a remainder of the welding device 2.

During operation, the welding device 2 may be easily set up by first positioning the welding device 2 along a desired rotational axis. This is accomplished by any number of conventional methods. According to one method, the work piece is fixed to a stationary object and the axis of the welding device is aligned with the desired surface to be built-up. This may be accomplished initially by sight and then further adjusted once the welding device is set up by adjusting the ball joint anchor 9 and the adjustable brackets. In many instances, the work piece will include more than one area or surface that needs to be refurbished.

The effective radius of the welding core is then adjusted by adjusting the nozzle of the welding torch to an optimal working distance by swiveling the torch (the nozzle 19 and the second hollow arm 12) of the welding core via the swivel bearing 13 to a desired radial position.

After the welding device has been aligned along the axis of the surface and the welding torch has been adjusted to a desired radius and initial starting position, the welding device then commences operation. The spindle 21 is rotated about its axis and welding materials (welding current, welding wire and welding gas) are supplied through the welding core to the welding torch which then deposits a strip or bead of metal on the surface as the torch rotates. Because the spindle's axial position is a function of the clutch mechanism's contact with the threaded screw portion 4 of the spindle 21, as the spindle 21 rotates the axial position of the spindle changes. The screw thread density determines the number of spirals per inch that the torch moves, and a spiral pattern of welded material is built up on the inner bore surface. Once the desired portion of the bore is suitably built up, the welding device 2 is shut off. If desired, a further layer can be added by repeating the above process.

The removable welding core of the present invention, shown in FIGS. 4 and 5, comprises the transfer tube 27 rotatable along an axis; a swivel bearing 13 attached at a first end to the transfer tube 27 and aligned on the axis; and the second hollow arm 12 attached to a second end of said swivel bearing 13 so as to be movable relative to the axis where said transfer tube 27 attaches to a rotatable electrical connector comprising a first female portion and a second male portion wherein electrical contact is formed between an outer radial surface of said male portion and an inner surface of said female portion and the male portion is connected to a flexible conduit that carries the welding wire and the welding wire conduit, a conduit to transport the welding gas mixture and an electrical conductor from a wire/power/gas supply 37, only diagrammatically shown. This welding core is insertable and removable from the control and rotation controller; this controller comprises a hollow spindle; a drive mechanism for rotating the hollow spindle; and fixing means for holding the welding core.

The controller further comprises a manual clutch mechanism for allowing adjustment along the axis of rotation and a screw mechanism that coordinates the axial movement of the spindle 21. The spindle 21 may be connected to the welding core via electrically insulated means in order to isolate the spindle 21 from the electrical current and minimize the exposure of welding current to the lower portion of the welding core.

Figure 6:
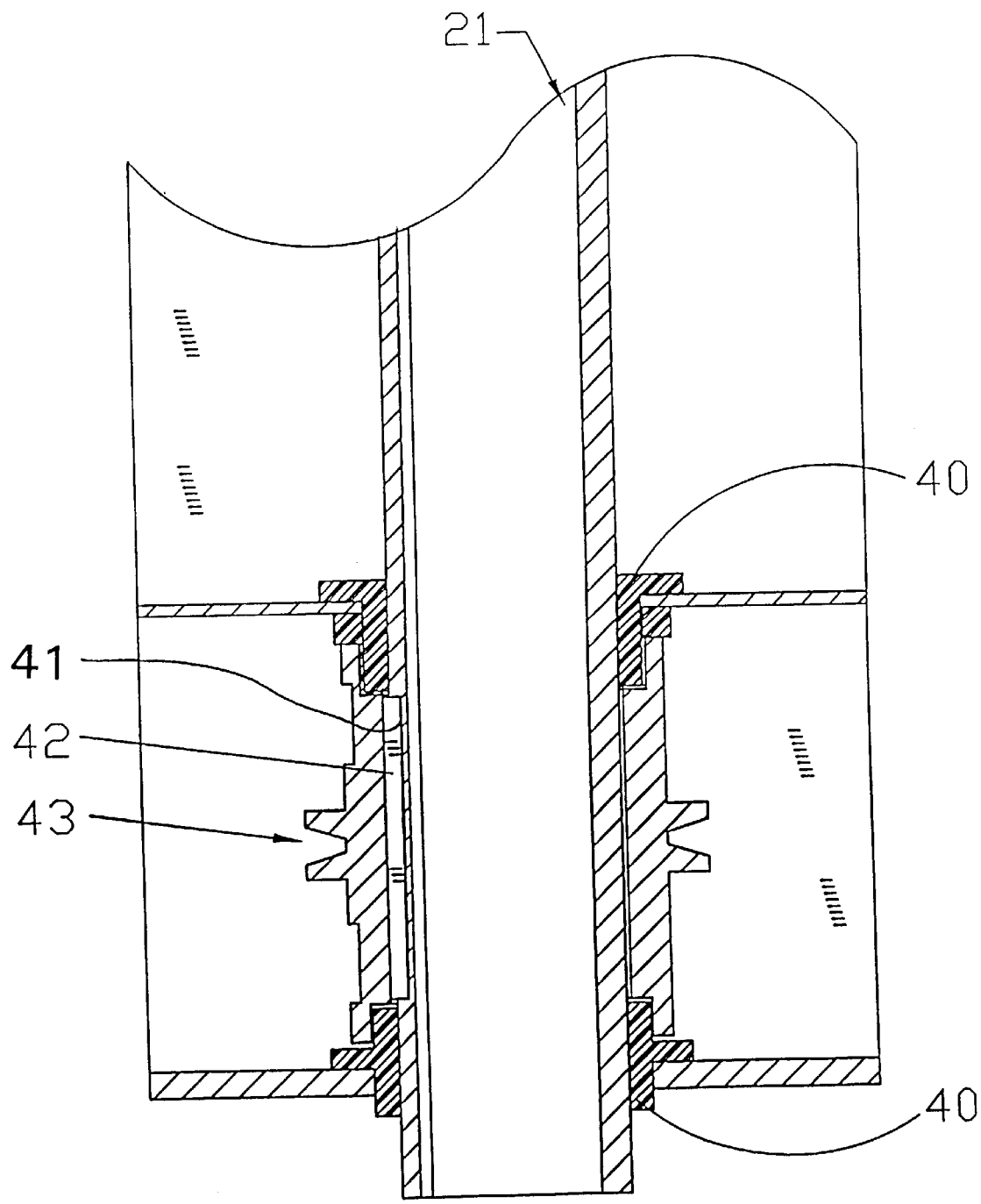
FIG. 6 is a partial cross sectional view of the hollow spindle assembly.

FIG. 6 shows the spindle assembly which comprises the spindle 21, a key way 41 disposed along the exterior surface of the spindle 21, a key 42 disposed in said key way 41, a spindle drive pulley 43 coupled to said key 42 and the positioning means (spindle bushing) 40. A drive V-belt 51 wraps around the spindle drive pulley 43 as well as the motor pulley 52 driven by a motor M (see FIG. 7).

Figure 7:
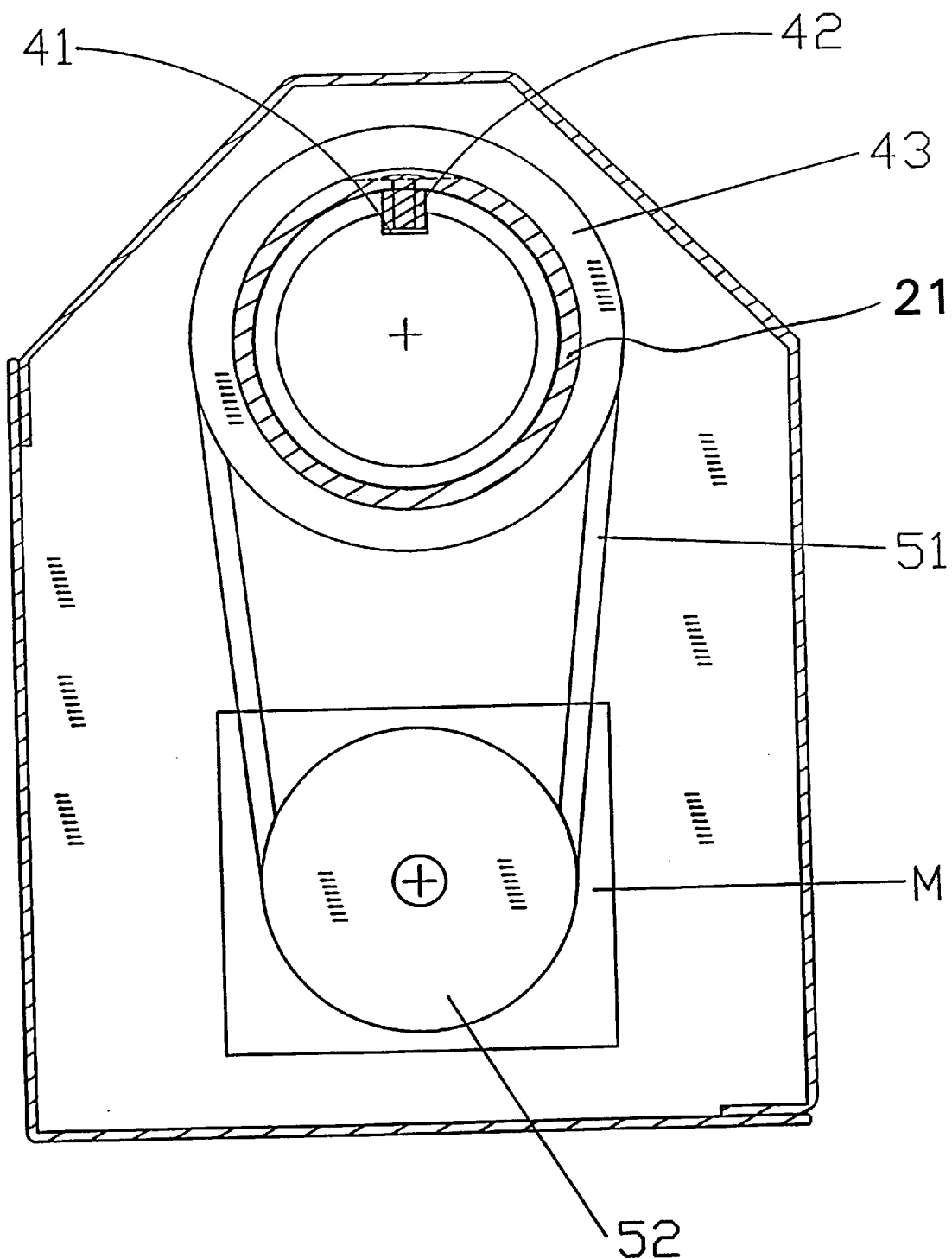
FIG. 7 is a horizontal plan view showing the spindle and its rotation drive mechanism.

FIG. 7 shows a partial cross-sectional view of the motor-pulley 52, the V-belt 51 and spindle drive pulley 43. This Figure also shows the spindle 21, with the key 42 and the key way 41 with a spindle bushing 40 (FIG. 6) disposed between spindle 21 and the spindle drive pulley 43.

Figures 8A, 8B:
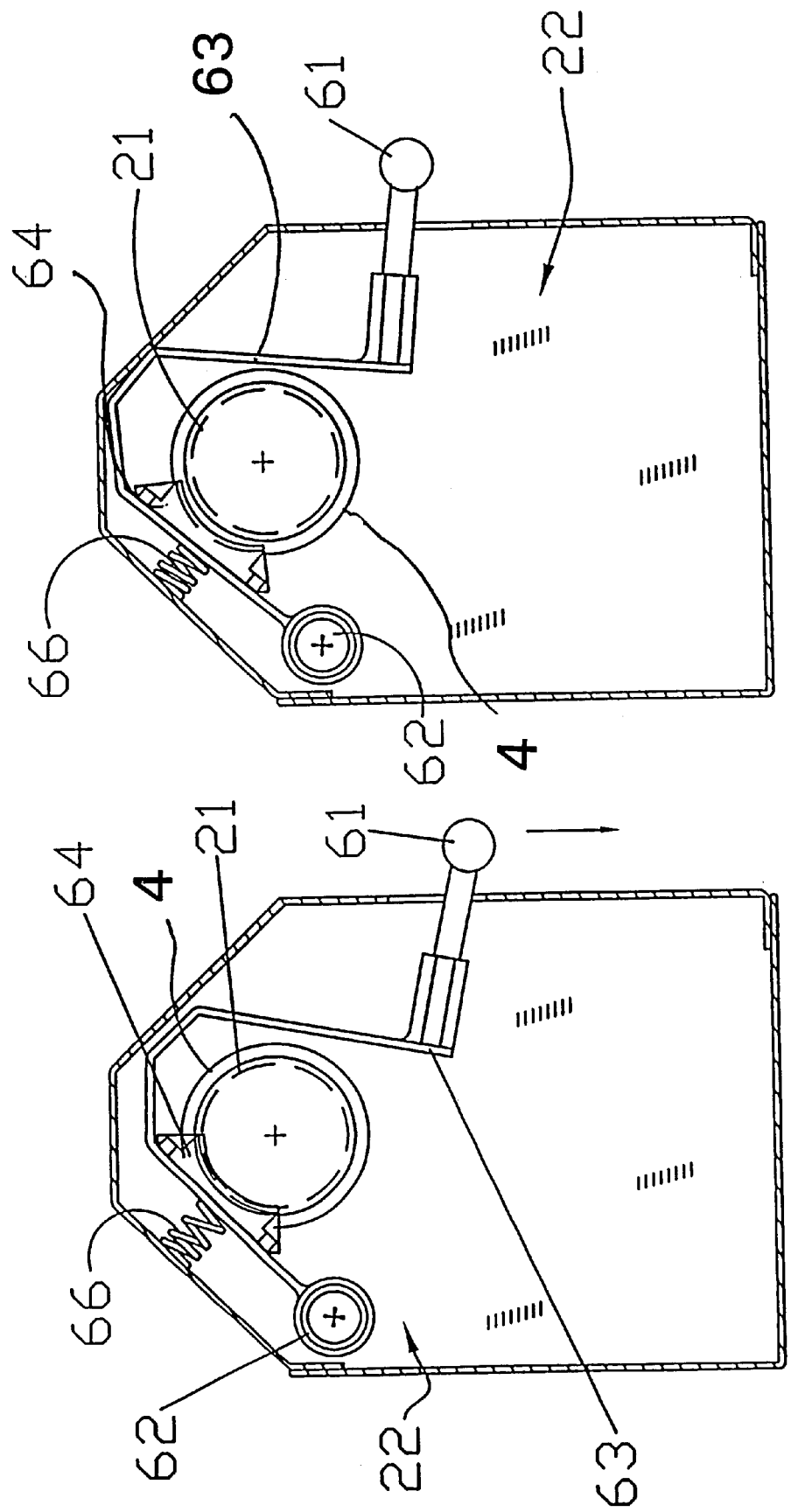
FIG. 8A is a diagrammatic horizontal plan view of the spindle and the clutch mechanism showing a clutch engaged position.
FIG. 8B is a diagrammatic horizontal plan view of the spindle and the clutch mechanism showing a clutch disengaged position.

FIGS. 8A and 8B show partial cross-sectional views of the control box or housing and illustrates operation of the clutch control mechanism 22. As can be seen in these Figures, a clutch control knob 61, is connected to a clutch pivot point 62 via a clutch arm 63 that is tensioned through a tensioning means pressing a threaded nut section 64 against the threaded exterior portion 4 of the spindle 21. As shown in these Figures, the tensioning means is a simple spring 66. In FIG. 8A, the nut section 64 engages with the threaded exterior portion 4 of the spindle 21 and in FIG. 8B the clutch disengages the nut section 64 from the threaded exterior portion 4 of the spindle 21.

Figure 10:
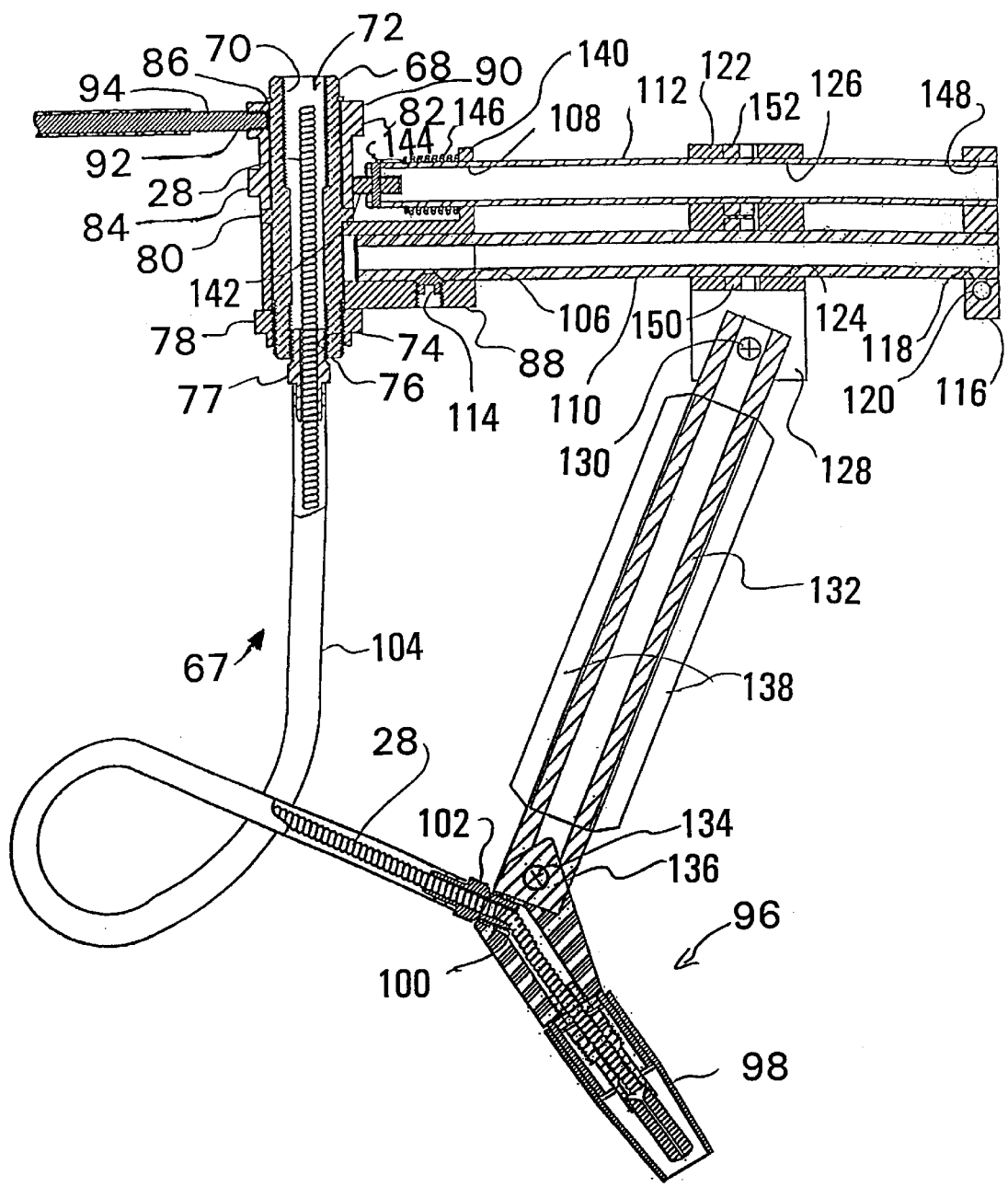
FIG. 10 is a diagrammatic cross sectional view of the rotary welding attachment member of FIG. 9.
Figure 11:
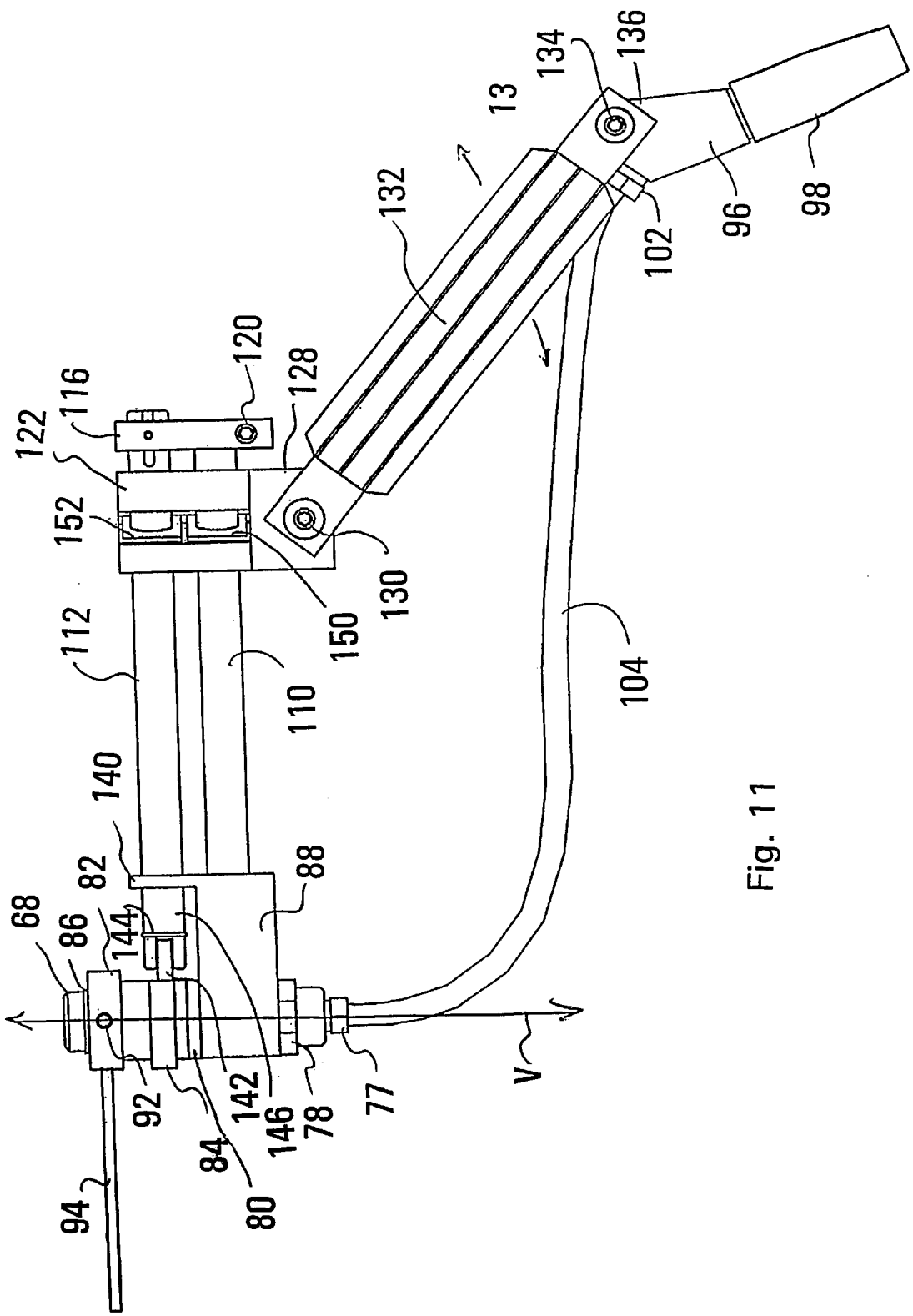
FIG. 11 is a diagrammatic front elevational view of a rotary welding attachment member of FIG. 9 shown in a second welding position.
Figure 12:
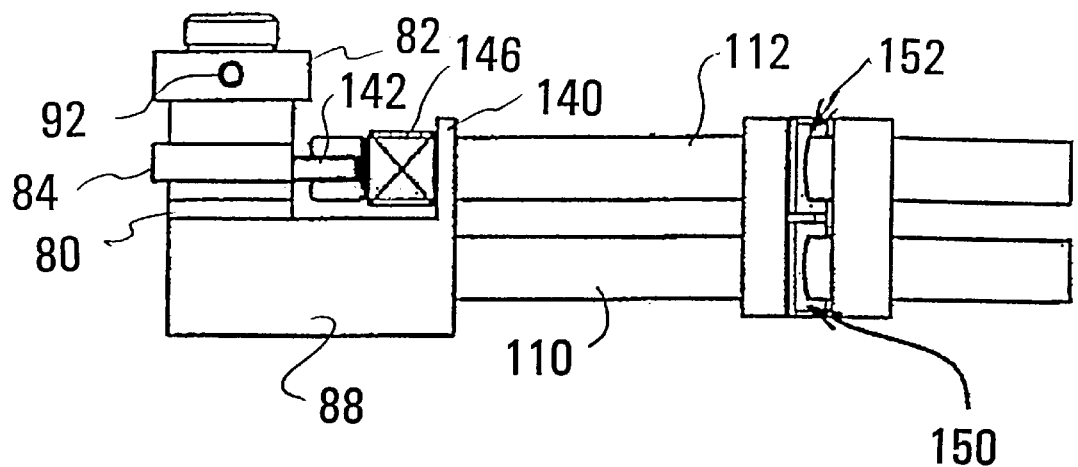
FIG. 12 is a diagrammatic front elevational view of the rotary welding attachment member of FIG. 9 to provide radially inward movement of the rider block.
Figure 17:
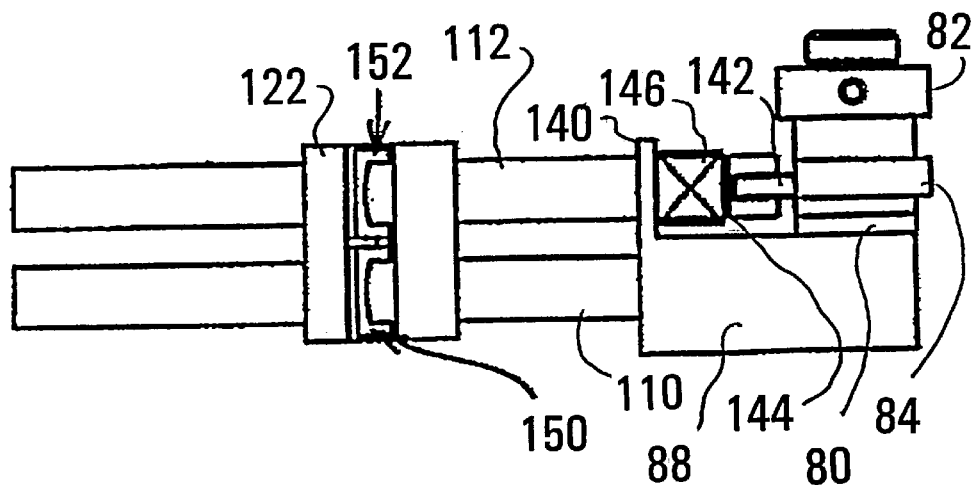
FIG. 17 is a diagrammatic front elevational view of the rotary welding attachment member of FIG. 9 to provided radially outward movement of the rider block.
Figure 13:
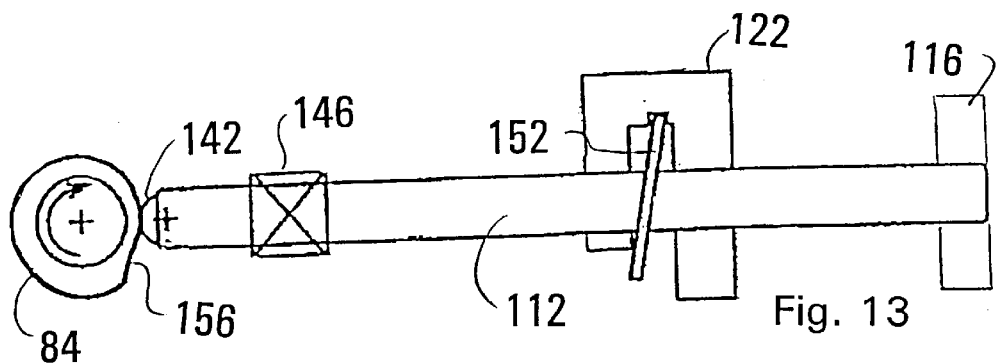
FIG. 13 is a diagrammatic top plan view of the rotary welding attachment member of FIG. 12 showing the position of the cylindrical indexing arm at the commencement of a radially inward indexing stroke.
Figure 14:
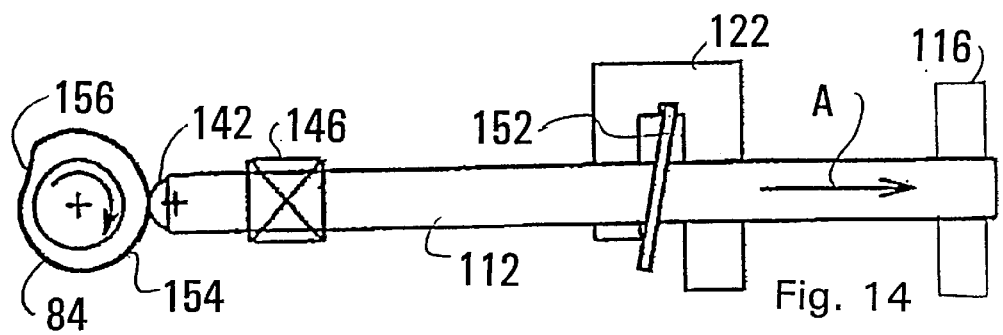
FIG. 14 is a diagrammatic top plan view of the rotary welding attachment member of FIG. 12 showing an intermediate position of the cylindrical indexing arm during a radially inward indexing movement.
Figure 15:
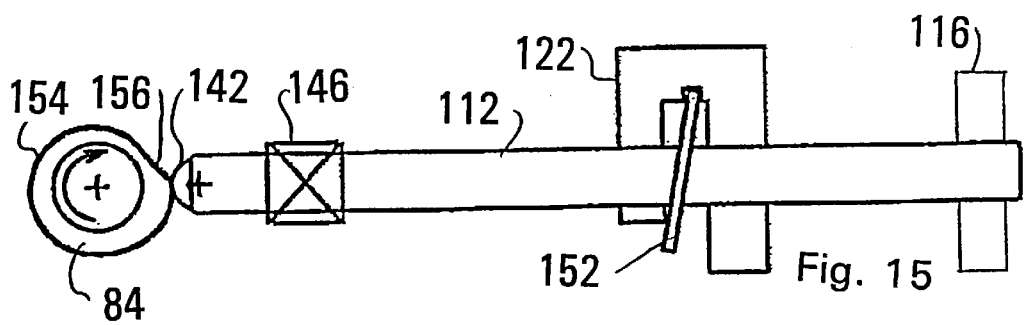
FIG. 15 is a diagrammatic top plan view of the rotary welding attachment member of FIG. 12 showing a maximum energy storage position of the cylindrical indexing arm just prior to the radially inward indexing motion of the rider block.
Figure 16:
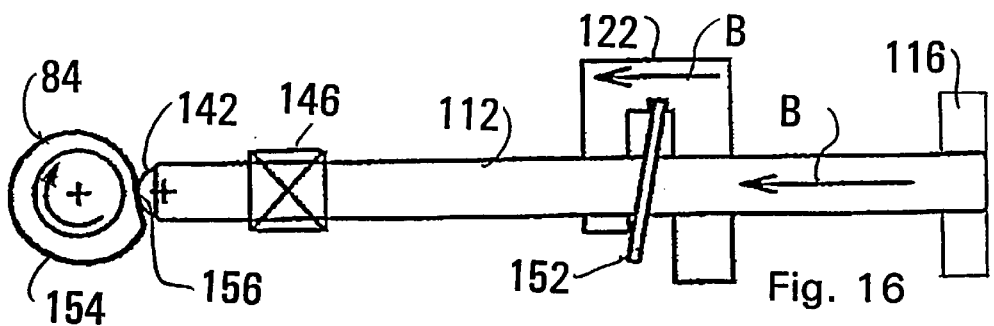
FIG. 16 is a diagrammatic top plan view of the rotary welding attachment member of FIG. 12 showing an intermediate position of the cylindrical indexing arm when carrying the rider block radially inward.
Figure 18:
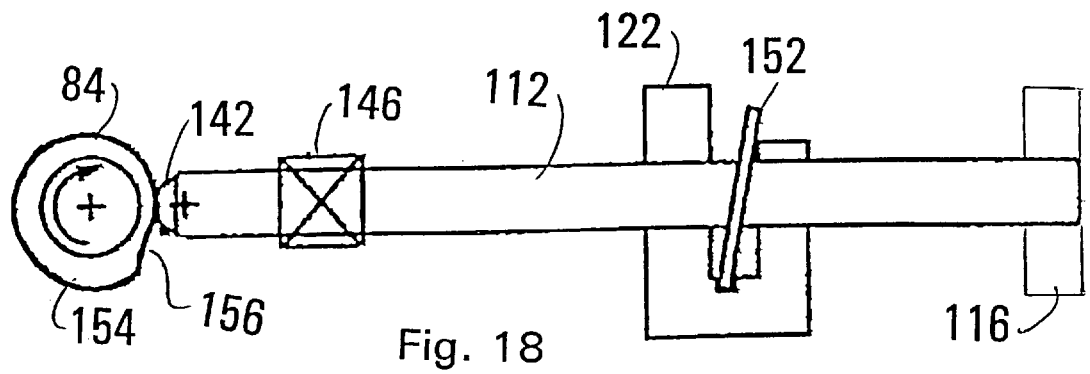
FIG. 18 is a diagrammatic top plan view of the rotary welding attachment member of FIG. 17 showing the position of the cylindrical indexing arm at the commencement of a radially outward indexing movement.
Figure 19:
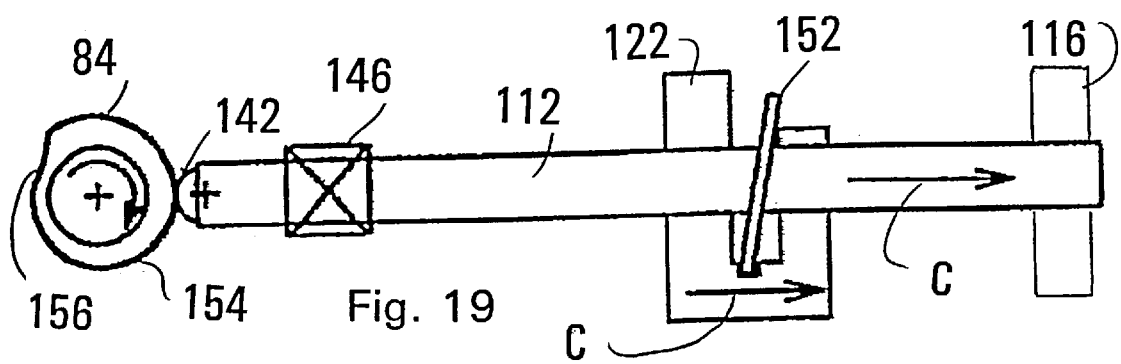
FIG. 19 is a diagrammatic top plan view of the rotary welding attachment member of FIG. 17 showing an intermediate position of the cylindrical indexing arm, during its radially outward indexing stroke, when carrying the rider block radially outward.
Figure 20:
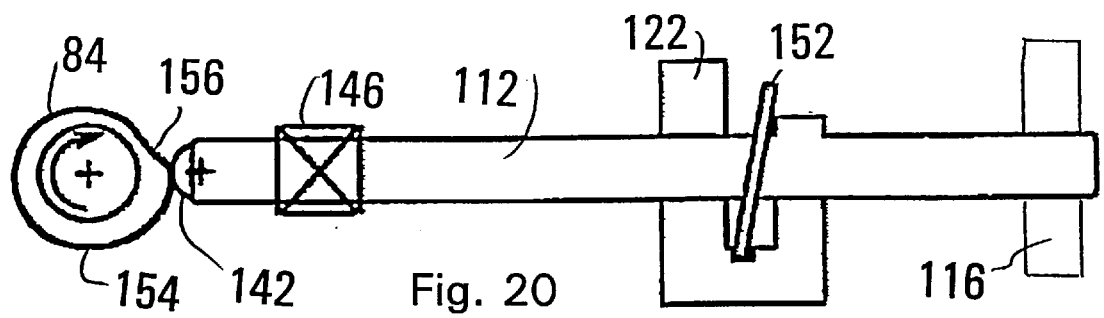
FIG. 20 is a diagrammatic top plan view of the rotary welding attachment member of FIG. 17 showing a maximum energy storage position of the cylindrical indexing arm just prior to a radially inward indexing motion of the indexing arm.

The welding device 2, discussed above, allows a very uniform volume of welding material to be deposited on the inner surface of a cylindrical bore. With reference now to FIGS. 9–11, a detailed description concerning a rotary welding attachment member 67, according to the present invention, for attachment to a lower end of the welding device 2, such as the swivel bearing 13 described above, will now be provided.

When use of the present invention is desired, the second hollow arm 12 is disconnected from the swivel bearing 13 and the rotary welding attachment member 67 is attached to the swivel bearing 13. If necessary, an adapter member 69 (see FIG. 22) may be required to connect these two components with one another. The adapter member 69 is provided for coupling the rotary welding attachment member 67 to a desired welding device 2. The adapter member 69 comprises an elongate adaptor housing 65 having, at a first end thereof, an external male thread 71 for engagement with a mating female thread of the rotary welding attachment member 67 and having, at a second end thereof, an external male thread 73 (or possibly an internal female thread depending of the type of welding device 2 to be coupled) for engagement with a desired welding device 2. The adapter member 69 is hollow, e.g. has a central through bore 75, to facilitate passage of a welding current, a welding wire and a welding gas therethrough to the rotary welding attachment member 67.

The rotary welding attachment member 67 generally comprises a cylindrical brass hub 68 (see FIG. 10) which has an interior female thread 70 which is threadingly engaged with a mating male thread (not shown) carried by an exterior surface of a lower end portion of the swivel bearing 13, an adaptor member 69 or some other component of a conventional welding device 2. The cylindrical brass hub 68 has a centrally located cylindrical bore 72 extending completely therethrough. A lower downwardly facing end of the cylindrical bore 72, of the cylindrical brass hub 68, has an interior female 74 thread which mates with a mating male 76 thread of a first nipple coupling 77. The lower downwardly facing end of the cylindrical bore 72, of the cylindrical brass hub 68, also has mating exterior male thread 74 which mates with a mating female thread 76 of a locking nut 78. The centrally located cylindrical bore 72, of the cylindrical brass hub 68, allows the welding wire, supported within flexible wire conductor 28, and the welding gas, fed from the welding device 2, to be conveyed to the torch tip 98, and a further description concerning the same will follow.

An intermediate exterior surface of the cylindrical brass hub 68 supports an annular flange 80. A cam member 82, having a cam surface 84, is supported vertically above but adjacent the annular flange 80. A C-clip or snap ring 86, manufactured from steel or stainless steel, for example, is utilized to retain the cam member 82 on the cylindrical brass hub 68 adjacent the annular flange 80 but allows relative motion between the cam member 82 and the cylindrical brass hub 68.

A rotatable base 88, having a cylindrical bore extending therethrough, is received by a vertically lower portion of the cylindrical brass hub 68 and is brought into engagement with a vertically lower, downwardly facing surface of the annular flange 80 via a sufficient tightening of the locking nut 78. As a result of such tightening, the rotatable base 88 becomes fixed to and rotates with the cylindrical brass hub 68 as an integral unit, and the importance of this coupling feature will be appreciated below.

A vertically upper flange 90 of cam member 82 has at least one and preferably two or more threaded bores 92 spaced about the cam member's perimeter. An elongate shaft 94, having a mating thread at one end thereof, is engaged with a desired one of the threaded bores 94 of the cam member 82. During use of the rotary welding attachment member 67, the elongate shaft 94 will be rotated into abutment with a stationary member, e.g. the mounting rod 8 (see FIG. 1), and such abutment will prevent further rotation of the cam member 82. Thus, as the rotary welding attachment member 67 operates, relative motion is provided between the stationary cam member 82 and the rotatable base 88. The elongate shaft is manufactured from aluminum or some other metal and is preferably rubber coated, or coated with some other material which prevents the elongate shaft from conducting electricity therealong to the mounting rod 8, for example.

A torch head 96, supporting the torch tip 98, has a threaded bore 100 which receives a second nipple coupling 102. A flexible tubing 104, preferably manufactured from high temperature silicone rubber, has a first end connected to the first nipple coupling 77 and a second end connected to the second nipple coupling 102. The flexible tubing 104 has a length of between about 6 to about 20 inches or so and interconnects the first and second nipple couplings 77, 102 with one another. The flexible tubing 104 and the two nipple couplings 77, 102 facilitate conveyance of the welding wire and the welding gas from a remainder of the welding device 2 to the torch head 96. The flexible tubing 104 facilitates orientation of the welding head 96, in a desired welding orientation (e.g see FIGS. 9 and 11), determined by the operator, and the importance of the same will be discerned from the following description.

The rotatable base 88 has a pair of horizontally extending bores 106, 108 which each support a radially extending arm, one of the horizontally extending bores 108 is formed in a base bracket 140 supported by the rotatable base 88. A first horizontally extending bore 106 supports a cylindrical support arm 110 while a second horizontally extending bore 108 supports a cylindrical indexing arm 112. Both of the cylindrical arms 110, 112 have an axial length of between about 2 to about 20 inches, preferably about 7 inches. A first end of the cylindrical support arm 110 is securely attached to the rotatable base 88 by a set screw 114, or some other conventional fastener. A stop member 116, having a first cylindrical bore 118, receives the opposed second end of the cylindrical support arm 110. The stop member 116 is securely attached to the second end of the cylindrical support arm 110 by a clamping screw 120 (not shown in detail) in a conventional fashion to prevent relative motion of the opposed second end of the cylindrical support arm 110 with respect to the stop member 116.

A rider block 122 has a pair of horizontal arm through bores 124, 126 extending therethrough and each one of these arm through bores 124, 126 is designed to have a very close tolerance with and accommodate one of the cylindrical arms, e.g. either the cylindrical support arm 110 or the cylindrical indexing arm 112. A bushing or bearing may be located within one or both of arm through bores 124 or 126 and the bearing is preferably manufactured from bronze or some other material which allows relative sliding movement between the cylindrical support arm 110, preferably manufactured from brass, and the rider block 122, preferably manufactured from aluminum, without allowing any excessive electrical arcing to occur between those components during operation of the welding device 2. The bearing facilitates sliding movement of the rider block 122 along the length of the cylindrical support arm 110 while still achieving a sufficient electrical conductive path between those two components.

A lower portion of the rider block 122 supports a first pivot bracket 128 which is pivotal coupled, via pivot pin 130, to a first end of a pivotable arm 132. An opposite second end of the pivotable arm 132 is pivotably coupled, via pivot pin 134, to a second pivot bracket 136 supported by the torch head 96. The two pivot pins 130, 134, of the pivotable arm 132, allow the torch head 96 to be located in a variety of different orientations, relative to a remainder of the welding device 2, to achieve desire welding by the torch tip 98. The pivotable arm 132 has a plurality of fins 138 extending radially from an exterior surface of the pivotable arm 132. The fins 138 facilitate quick dissipation of any heat generated in the pivotable arm 132 during operation of the welding device 2. That is, the pivotable arm 132 functions as a heat sink and quickly dissipates a majority of the generated heat.

An electrical path is established from the cylindrical brass hub 68 to the torch tip 98 via the rotatable base 88, the cylindrical support arm 110, possibly the bearing (not shown), the rider block 122, the first pivot bracket 128, the pivotable arm 132, the second pivot bracket 136, pivot pins 130 and 134, and the torch head 96 so that electrical energy is ultimately furnished by the welding device 2 to the torch tip 98 for welding.

The stationary cam member 82, of the rotary welding attachment member 67, supports the cam surface 84 having an exterior profile which can be seen more clearly in FIGS. 13–16 and 18–21. The rotatable base 88 supports the bracket base 140 which extends vertically along a vertical axis V of the welding device 2 and the base bracket 140 contains the horizontally extending bore 108 therein which is sized to receive and accommodate a first end portion of the cylindrical indexing arm 112 while still allowing sliding movement between the cylindrical indexing arm 112 and the base bracket 140. A roller 142, designed to mateingly engage with and roll along the cam surface 84, is supported at the first end of the cylindrical indexing arm 112. A shoulder 144 is provided adjacent the first end portion of the cylindrical indexing arm 112, supporting the roller 142, and a spring 146, surrounding the cylindrical indexing arm 112, is located between the shoulder 144 and the base bracket 140. The spring 146 biases the roller 142 into engagement with the cam surface 84 and maintains continuous and constant engagement therebetween.

Due to this arrangement, as the rotatable base 88 rotates relative to the stationary cam member 82, a camming action is created between the roller 142 and the cam surface 84 and a further discussion concerning the same will follow. The opposed second end of the cylindrical indexing arm 112 is received within, surrounded and guided by an indexing bore aperture 148 provided in the stop member 116 but the cylindrical indexing arm 112 remains, at all times, freely movable relative to the stop member 116. An intermediate portion of the cylindrical indexing arm 112 cooperates with the second bore 126 of the rider block 122 but remains, at all times, freely movable relative to the rider block 122.

As can be seen in the drawings, both the cylindrical indexing arm 112 and the cylindrical support arm 110 extend substantially parallel to one another and both cooperate with the rider block 122. The rider block 122 supports a pair of spaced apart locking plates 150, 152 which each have a circular aperture extending therethrough. The cylindrical indexing arm 112 passes through the circular aperture of an indexing locking plate 152 while the cylindrical support arm 110 passes through the circular aperture of a support locking plate 150. Both of the locking plates 150, 152 are spring biased, by a compression spring (not shown in detail), toward a partially skewed arrangement, e.g. the locking plates 150, 152 are biased into an orientation which is aligned at an angle of about 80–85 degrees relative to longitudinal axes of the cylindrical support and cylindrical indexing arms 110, 112 so that the locking plates 150, 152 tend to engage with either the cylindrical indexing arm 112 or the cylindrical support arm 110 and prevent movement of the rider block 122, relative to the associated cylindrical arm 110 or 112, in a first direction of relative movement but will allow sliding movement of the rider block 122, relative to the associated cylindrical arm 110 or 112, in an opposite direction of relative movement. That is, if the movement of the respective cylindrical indexing arm 112 or the cylindrical support arm 110, relative to the rider block 122, tends to bias the associated locking plate 152 or 150 into a substantially normal orientation, with respect to the longitudinal axis of the associated cylindrical arm 112 or 110, such relative movement is allowed while if the movement of the respective cylindrical indexing arm 112 or the cylindrical support arm 110 tends to skew further the associated locking plate 152 or 150, a locking engagement is achieved between the associated locking plate 150 or 152 and the associated cylindrical indexing or support arm 110 or 112 and such relative movement with respect to the rider block 122 is prevented.

In the event that an operator, however, desires to move the rider block 122 from the position shown in FIG. 9 to the position shown in FIG. 11, for example, the operator merely simultaneously grabs both the index and the support locking plates 150, 152 and biases them toward the right (as can be seen in FIGS. 9 and 11) so that the respective locking plates 150, 152 are biased into a substantially normal orientation with respect to the longitudinal axes of the cylindrical indexing and the support arms 112, 110. Once the two locking plates 150,152 are in this orientation, the operator can then readily and freely slide the rider block 122 towards a desired orientation along the cylindrical index and support arms 112, 110. Once the desired position is achieved, the operator releases both of the locking plates 150, 152 and thereafter the locking plates 150,152 will facilitate retention of the rider block 122 in its newly adjusted position.

With reference now to FIGS. 13–16, the indexing mechanism, e.g. the cam surface 84, the roller 142, the spring 146, the rider block 122, and the locking plate 152, according to the present invention, will now be described in detail. The indexing mechanism shown in these four Figures will induce, upon rotation of the rotatable base 88 relative to the cam surface 84 supported by the stationary cam member 82, a small incremental radial inward indexing motion or step of the rider block 122 relative to the vertical axis V, e.g. a small radial outward indexing step is also possible and a further discussion concerning the same is provided below with reference to FIGS. 17–21. Preferably the magnitude of the radial inward or outward indexing step is between 0.08 inch and 0.15 inch and most preferably about ⅛ inch or so. It is to be appreciated that the magnitude of the indexing step can vary from application to application, and is directly dependent upon the profile of the exterior surface of the cam surface 84. The cam surface profile can be readily modified, by those skilled in the art, to suit the specific welding application at hand.

As mentioned above, the spring 146 continuously biases the roller 142, of the cylindrical indexing arm 112, radially inward toward the cam surface 84 so that there is constant and continuous engagement between the roller 142 and the cam surface 84. As the rotatable base 88 rotates relative to the cam member 84 along the gradual inclining surface 154 (the elongate shaft 94 maintains the cam member 82 stationary), the roller 142 is gradually biased radially outwardly, along with its associated cylindrical indexing arm 112, against the bias of the spring 146, so that there is a slow gradual relative movement of the cylindrical indexing arm 112 (in the direction of arrow A shown in FIG. 14) relative to the rotatable base 88, the cylindrical support arm 110, the rider block 122 and the stop member 116. During this slow gradual relative movement, the cylindrical indexing arm 112 tends to bias the associated indexing locking plate 152 toward a substantially perpendicular non-skewed orientation, relative to the longitudinal axis of the cylindrical indexing arm 112, and thus the indexing locking plate 152 does not sufficiently grip the exterior surface of the cylindrical indexing arm 112 but allows the cylindrical indexing arm 112 to move relative thereto without undue friction.

The support locking plate 150 associated with the cylindrical support arm 110, however, assists with retaining the rider block 122 in a fixed orientation relative to the cylindrical support arm 110 and prevents any movement of the rider block 122 during relative movement of the cylindrical indexing arm 112. The radial outward movement of the indexing arm 112 continues until the cam surface 84 has reached its peak amplitude and has compressed the spring 146 about an ⅛ inch or so (see FIG. 15).

Further rotation of the rotatable base 88, relative to the cam surface 84, then allows the roller 142 to roll down along the rapidly declining surface 156 of the cam member 82 (see FIG. 16) and such motion causes the cylindrical indexing arm 112 to be biased radially inwardly, due to the biasing action of the spring 146 against the shoulder 144. Such radial inward movement of the cylindrical indexing arm 112 causes the indexing locking plate 152 to be skewed further and thus the indexing locking plate 152 grips and engages with the exterior surface of the cylindrical indexing arm 112. Such engagement thus causes the rider block 122 to be conveyed radially inwardly along with the return motion of the cylindrical indexing arm 112 (in the direction of arrow B shown in FIG. 16) until the cylindrical indexing arm 112 reaches the end of the rapidly declining surface 156 and thus discontinues its radial inward movement. Such movement of the rider block 122 tends to bias the support locking plate 150 toward a substantially perpendicular non-skewed orientation, relative to the longitudinal axis of the cylindrical support arm 110, and thus the support locking plate 150 does not sufficiently grip the exterior surface of the cylindrical support arm 110 but allows the rider block 122 to move relative to the cylindrical support arm 110 without undue friction.

Once the cylindrical indexing arm 112 again commences its radial outward movement, by being biased radially outward again due to the roller 142 being forced radially outward by the gradual inclining surface 154 of the cam member 82, such change is direction releases the indexing locking plate 152 from the cylindrical indexing arm 112. Thereafter, the cylindrical indexing arm 112 is again freely radially movable outwardly and then repeats the above discussed radial outward movement.

With reference now to FIGS. 17–21, a second embodiment of the indexing mechanism, according to the present invention, will now be described in detail. The indexing arrangement shown in these four Figures will induce, upon rotation of the rotatable base 88 relative to the cam surface 84 supported by the stationary cam member 82, a small incremental radial outward indexing motion or step of the rider block 122 relative to the vertical axis V. Preferably the magnitude of the radial outward indexing step is between 0.08 inch and 0.19 inch and most preferably about ⅛ inch or so. It is to be appreciated that the magnitude of the indexing step can vary from application to application, and is directly dependent upon the profile of the exterior surface of the cam member 82.

To achieve the radially outward indexing arrangement, the stop member 116 is disconnected and removed from the cylindrical indexing and supports arms 112, 110 and thereafter the rider block 122 is removed from the cylindrical indexing and supports arms 112, 110 by suitable actuation of both of the locking plates 152, 150 to their substantially normal orientation. The rider block 122, once removed, this then flipped over or rotated 180 degrees so that the end face of the rider block 112 previously facing the stop member 116 is now facing the rotatable base 88 and the opposite end face is now facing the stop member 116. The rider block 122 is then re-engaged with and positioned along the cylindrical indexing and support arms 112, 110. Finally, the stop member 116 is reconnected with the cylindrical indexing and supports arms 112, 110.

The spring 146 still, as with the first embodiment, continuously biases the roller 142, of the cylindrical indexing arm 112, inwardly toward the cam surface 84 so that there is constant and continuous engagement between the roller 142 and the cam surface 84. As the rotatable base 88 rotates relative to the cam member 82, the roller 142 rides along the gradual inclined surface 154 of the cam member 82 and the roller 142 is gradually biased radially outwardly, along with its connected cylindrical indexing arm 112, against the bias of the spring 146, so that there is a slow gradual relative movement of the cylindrical indexing arm 112 relative to the rotatable base 88, the cylindrical support arm 110, the rider block 122 and the stop member 116 (see FIGS. 19 and 20). During this slow gradual relative movement, the cylindrical indexing arm 112 tends to bias the associated indexing locking plate 152 toward a substantially skewed orientation, relative to the longitudinal axis of the cylindrical indexing arm 112. As a result of this arrangement, the indexing locking plate 152 grips and engages with the exterior surface of the cylindrical indexing arm 112. Such engagement thus causes the rider block 122 to be also gradually conveyed radially outwardly along with the cylindrical indexing arm 112 (in the direction of arrow C shown in FIG. 19) until the roller 142 reaches the end of the gradually inclining surface 154 of the cam member 82 and thus the cylindrical indexing arm 112 discontinues its radial outward movement. During such radial outward movement, the support locking plate 150 associated with the cylindrical support arm 110 tends to be moved toward a normal orientation, relative to the longitudinal axis of the cylindrical support arm 110, and does not inhibit movement of the rider block 122.

Thereafter, the cylindrical indexing arm 112 commences a radial inward movement as the spring 146 biases the roller 142 to roll along the rapid declining surface 156 of the cam member 82. As soon as the cylindrical indexing arm 112 commences its radial inward movement, such movement releases the indexing locking plate 152 from the cylindrical indexing arm 112. That is, the radial inward movement tends to orientate the indexing locking plate 152 into a substantial normal non-skewed orientation, relative to the longitudinal axis of the cylindrical indexing arm 112, which allows the cylindrical indexing arm 112 to move freely radially inwardly relative to the rider block 122. The support locking plate 150 associated with the cylindrical support arm 110, however, tends to be moved toward a skewed orientation and retains the rider block 122 in a fixed orientation relative to the cylindrical support arm 110 to prevent any movement of the rider block 122 during relative radial inward movement of the cylindrical indexing arm 112.

Figure 21:
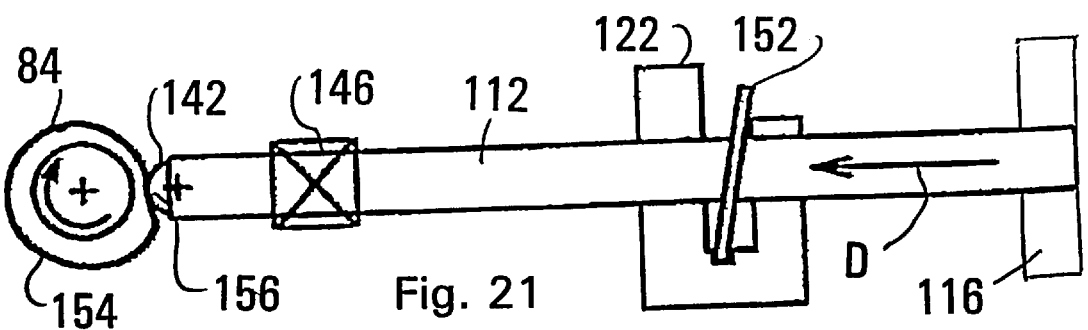
FIG. 21 is a diagrammatic top plan view of the rotary welding attachment member of FIG. 17 showing an intermediate position of the cylindrical indexing arm when moving radially inwardly without moving the rider block.

The radial inward movement of the indexing arm 112 continues until the roller 142 reaches the minimum amplitude in the profile of the cam surface 84 and the spring 146 has re-expanded about an ⅛ inch or so (see FIG. 21). Further rotation of the rotatable base 88, relative to the cam surface 84, then causes the roller 142 to again roll along the gradually inclining surface 154 of the cam member 82 and such motion again causes the cylindrical indexing arm 112 to be biased radially outward and the above discussed radially outward movement is again repeated to further index the rider block 122 radially outward.

According to the first embodiment, the cam surface 84 has a gradually inclining surface 154 which extends over an arc length of about 315 degrees or so around a perimeter of the cam member 82 while the rapidly declining surface 156 extends over an arc length of about 45 degrees or so around the perimeter of the cam member 82. Typically, the gradually inclining surface 154, of the cam member 82, extends over an arc length of between about 180 to 315 degrees around a perimeter of the cam member 84 while a rapidly declining surface 154, of the cam member 82, extends over an arc length of between about 45 to about 180 degrees around the perimeter of the cam member 82. It is to be appreciated that the arc length angles of the gradually inclining surface 154 and the rapidly declining surface 156 can be readily varied, by those skilled in the art, depending on the specific application at hand.

It is desirable for the relative motion between the rider block 122 and the associated cylindrical support arm 110 to occur over a relatively short arc length, e.g. over an arc length of at least 15 degrees or so, and more preferably over an arc length of at least 45 degrees or so, so as to minimize the electrical resistance at the interface between the rider block 122 and the cylindrical support arm 110. It is to be appreciated that when the rider block 122 is reversed to move radially outward, as discussed above, the opposition effect is achieved, i.e. the outward motion between the rider block 122 and the associated cylindrical support arm 110 occurs over a relatively large arc length, e.g. over an arc length of about 315 degrees or so. To compensate for this, the snap ring 86 could be removed and a new cam member 82 installed, having a profile which biases the cylindrical indexing arm 112 outwardly fairly quickly, e.g. over an arc length of about 45 to about 120 degrees or so, preferably a minimum of 90 degrees. Such a cam member would minimize the electrical resistance flow at the interface between the rider block 122 and the cylindrical support arm 110.

To prevent vertical movement of the spindle 21, the first clamp 6 is moved vertically downward along the spindle 21 so as to abut against a top surface of the housing 3. Thereafter, the clutch control mechanism 22 is disengaged from the spindle 21 and the welding device 2 will rotate without any axial movement of the spindle 21, i.e. the welding tip 18 will rotate in a plane. If desired the second clamp 25 can be moved vertically upward along the spindle 21 so as to abut against a bottom surface of the housing 3 to ensure no vertical movement of the spindle 21 occurs in either direction. The present invention can be employed to build up vertically oriented surfaces, inclined surfaces and horizontally oriented surfaces.

Since certain changes may be made in the above described rotary welding attachment member without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A rotary welding attachment member comprising:
   a cam member having a cam surface;
   a rotatable base movable relative to the cam member, the rotatable base supporting a support rod and the support rod supporting a rider block which is movable along the support rod;
   a movable torch head, supporting a welding tip, being supported by the rider block;
   the torch head being coupled to the rotatable base via a flexible coupling to facilitate conveyance of a welding wire and a welding gas to the torch tip while the rotatable base, the support rod, the rider block and the torch head facilitating a supply of electrical current to the torch tip; and
   an indexing mechanism, at least partially support by the rotatable, base and cooperating with the cam surface, for moving the rider block radially along the support rod as the rotatable base rotates;
   wherein a first end portion of the indexing arm has a shoulder and the rotatable base supports a base bracket and a spring is located between the base bracket and the shoulder for biasing the roller into engagement with the cam surface.

2. The rotary welding attachment member according to claim 1, wherein the flexible connection between the stationary base and the welding head comprises a first nipple connected to the rotatable base and a second nipple connected to the welding head and a flexible tubing interconnecting the first nipple with the second nipple to facilitate advance of welding wire and welding gas to the welding head.

3. The rotary welding attachment member according to claim 1, wherein the cam member has a shaft that extends radially outward therefrom to facilitate engagement of the shaft with a fixed component to maintain the cam member stationary during operation of the rotary welding attachment member.

4. The rotary welding attachment member according to claim 1, wherein the indexing mechanism comprises an indexing rod supported by the rotatable base, the indexing rod having a roller which is biased, by a spring, into engagement with the cam surface of the cam member and the indexing arm is coupled to the rider block to convey the rider block one of radially inward and radially outward as the indexing arm is radially conveyed due to the engagement between the roller and the cam surface.

5. The rotary welding attachment member according to claim 1, wherein a stop member is attached to a remote free-end of the support rod and a stop member has a second cylindrical bore for receiving and guiding the indexing arm to facilitate relative movement between the indexing arm and the stop member.

6. The rotary welding attachment member according to claim 1, wherein a gradually inclining surface, of the cam member, has an arc length which extends from about 180 to about 315 degrees around a perimeter of the cam member while a rapidly declining surface, of the cam member, has an arc length which extends from about 45 to about 180 degrees around the perimeter of the cam member.

7. The rotary welding attachment member according to claim 1, wherein an adapter member is provided for coupling the rotary welding attachment member to a desired welding device, and the adapter member is hollow to facilitate passage of a welding wire and a welding gas therethrough.

8. A rotary welding attachment member comprising:
   a cam member having a cam surface;
   a rotatable base movable relative to the cam member, the rotatable base. supporting a support rod and the support rod supporting a rider block which movable along the support rod;
   a movable torch head, supporting a welding tip, being supported by the rider block;
   the torch head being coupled to the rotatable base via a flexible coupling to facilitate conveyance of a welding wire and a gas to the torch tip while the rotatable base, the support rod, the rider block and the torch head facilitating a supply of electrical current to the torch tip; and
   an indexing mechanism, at least partially support by the rotatable base and cooperating with the cam surface, for moving the rider block radially along the support rod as the rotatable base rotates;
   wherein the rider block supports a first bracket and the torch head a supports a second bracket and a first end of a pivotable arm is connected to the first bracket while a second end of the pivotable arm is connected to the second bracket to facilitate support of the movable torch head by the rider block and pivoting movement of the torch tip to a desired welding orientation.

9. The rotary welding attachment member according to claim 8 wherein the pivotable arm has a plurality of radially extending fins which facilitate dissipation of heat from the pivotable arm during operation of the rotary welding attachment member.

10. A rotary welding attachment member comprising:
   a cam member having a cam surface;
   a rotatable base movable relative to the cam member, the rotatable base supporting a support rod and the support rod supporting a rider block which is movable along the support rod;
   a movable torch head, supporting a welding tip, being supported by the rider block;
   the torch head being coupled to the rotatable base via a flexible coupling to facilitate conveyance of a welding wire and a welding gas to the torch tip while the rotatable base, the support rod, the rider block and the torch head facilitating a supply; of electrical current to the torch tip; and an indexing mechanism, at least partially support by the rotatable base and cooperating with the cam surface, for moving the rider block radially along the support rod as the rotatable base rotates;

wherein the rider block has an indexing locking plate which engages with the indexing arm and an indexing locking plate spring biases the indexing locking plate into a partially skewed position such that any motion of the indexing arm tending to orient the indexing locking plate in a transverse, non-skewed orientation facilitates relative movement between the indexing arm and the rider block while any motion of the indexing arm in the opposite direction tends to further skew the indexing locking plate and engage the rider block with the indexing arm so that the rider block is coupled to the indexing arm.

11. A rotary welding attachment member comprising:

a cam member having a cam surface a rotatable base movable relative to the cam member, the rotatable base supporting a support rod and the support rod supporting a rider block which is movable along the support rod;

a removable torch head, supporting a welding tip, being supported by the rider block;

the torch head being coupled to the rotatable base via a flexible coupling to facilitate conveyance of a welding wire and a welding gas to the torch tip while the rotatable base, the support rod the rider block and the torch head facilitating a supply of electrical current to the torch tip; and an indexing mechanism, at least partially support by the rotatable base and cooperating with the cam surface, for moving the rider block radially along the support rod as the rotatable base rotates;

wherein the rider block has a support locking plate which engages with the support arm and a support locking plate spring biases the support locking plate into a partially skewed position such that any relative motion of the support arm tending to orient the support locking plate in a transverse, non-skewed orientation facilitates relative movement between the support arm and the rider block while any relative motion of the support arm in the opposite direction tends to further skew the support locking plate and engage the rider block with the support arm so that the rider block is coupled to the support arm to prevent relative movement.

12. A rotary welding attachment member comprising:

a cam member having a cam surface;

a rotatable base movable relative to the cam member, the rotatable base supporting a support rod and the support rod supporting a rider block which is movable along the support rod;

a movable torch head, supporting a welding tip, being supported by the rider block;

the torch head being coupled to the rotatable base via a flexible coupling to facilitate conveyance of a welding wire and a welding gas to the torch tip while the rotatable base, the support rod, the rider block and the torch head facilitating a supply of electrical current to the torch tip; and an indexing mechanism, at least partially support by the rotatable base and cooperating with the cam surface, for moving the rider block radially along the support rod as the rotatable base rotates;

wherein a hub has a first end for engagement with a welding device, the hub is hollow to facilitate passage of a welding wire and a welding gas therethrough, and the hub supports both the cam member and the rotatable base.

13. The rotary welding attachment member according to claim 12, wherein the hub has a first and a second end portion and an annular flange located along an intermediate portion of the hub, and the rotatable base is sandwiched between the annular flange and a locking nut, at the second end portion of the hub, to render the rotatable base integral with the hub.

14. The rotary welding attachment member according to claim 13, wherein the cam member is supported by the first end portion of the hub and the cam member is located between the annular flange and a snap ring.

15. A rotary welding attachment member comprising:

a cam member having a cam surface a rotatable base movable relative to the cam member, the rotatable base supporting a support rod and the support rod supporting a rider block which is movable along the support rod;

a movable torch head supporting a welding tip, being supported by the rider block;

the torch head being coupled to the rotatable base via a flexible coupling to facilitate conveyance of a welding wire and a welding gas to the torch tip while the rotatable base the support rod, the rider block and the torch head facilitating a supply of electrical current to the torch tip; and an indexing mechanism at least partially support by the rotatable base and cooperating with the cam surface, for moving the rider block radially along the support rod as the rotatable base rotates;

wherein the rider block has a pair of bores extending therethrough, a first one of the bores is sized to receive and allow relative sliding motion between the rider block and the support arm while still facilitating conductance of electricity therethrough without excessive arcing, and a second one of the bores sized to receive and allow relative sliding motion between the rider block and the indexing arm.

16. A rotary welding attachment member comprising:

a cam member having a cam surface;

a rotatable base movable relative to the cam member, the rotatable base supporting a support rod and the support rod supporting a rider block which is movable along the support rod;

a movable torch head, supporting a welding tip, being supported by the rider block;

the torch head being coupled to the rotatable base via a flexible coupling to facilitate conveyance of a welding wire and a welding gas to the torch tip while the rotatable base, the support rod, the rider block and the torch head facilitating a supply of electrical current to the torch tip; and an indexing mechanism, at least partially support by the rotatable base and cooperating with the cam surface, for moving the rider block radially along the support rod as the rotatable base rotates;

wherein the rider block comprises at least one locking plate which, in a first normally biased position of the locking plate, locks the rider block with respect to the support rod and prevents relative motion therebetween, and, when the locking plate is moved to a second position, the locking plate allows free manual movement of the rider block relative to the support rod.

17. A rotary welding attachment member comprising:

a cam ember having a cam surface.

a rotatable base movable relative to the cam member, the rotatable base supporting a support rod and the support rod supporting a rider block which is movable along the support rod;

a movable torch head, supporting a welding tip, being supported by the rider block;

the torch head being coupled to the rotatable base via a flexible coupling to facilitate conveyance of a welding wire and a welding gas to the torch tip while the rotatable base, the support rod, the rider block and the torch head facilitating a supply of electrical current to the torch tip;

an indexing mechanism, at least partially supported by the rotatable base and cooperating with the cam surface, for moving the rider block radially along the support rod as the rotatable base rotates, the indexing mechanism comprising an indexing rod supported by the rotatable base, the indexing rod having a roller which is biased, by a spring, into engagement with the cam surface of the cam member and the indexing arm is coupled to the rider block to convey the rider block one of radially inwardly and radially outwardly as the indexing arm is radially conveyed to due to the engagement between the roller and the cam surface; and the rider block having an indexing locking plate which engages with the indexing arm and an indexing locking plate spring biases the indexing locking plate into a partially skewed position such that any motion of the indexing arm tending to orient the indexing locking plate in a transverse, non-skewed orientation facilitates relative movement between the indexing arm and the rider block while any motion of the indexing arm in the opposite direction tends to further skew the indexing locking plate and engages the rider block with the indexing arm so that the rider block is coupled to the indexing arm.

18. The rotary welding attach member according to claim 17, wherein the rider block has a support locking plate which engages with the support arm and a support locking plate spring biases the support locking plate into a partially skewed position such that any relative motion of the support indexing arm tending to orient the support locking plate in a transverse, non-skewed orientation facilitates relative movement between the support arm and the rider block while any, relative motion of the support arm in the opposite direction tends to further skew the support locking plate and engage the rider block with the support arm so that the rider block is coupled to the support arm to prevent relative movement.

19. The rotary welding attachment member according to claim 18, wherein a hub has a first end for engagement with a welding device, the hub is hollow to facilitate passage of a welding wire and a welding gas therethrough, and the hub supports both the cam member and the rotatable base;

the hub has an annular flange located along an intermediate portion of the hub, and the rotatable base is sandwiched between the annular flange and a locking nut, at a second end portion of the hub, to render the rotatable base integral with the hub;

the cam member is supported by the first end portion of the hub and the cam member is located between the annular flange and a snap ring; and a stop member is attached to a remote free-end of the support rod and a stop member has a second cylindrical bore for receiving and guiding the indexing arm to facilitate relative movement between the indexing arm and the stop member.

* * * * *